UNITED STATES PATENT OFFICE.

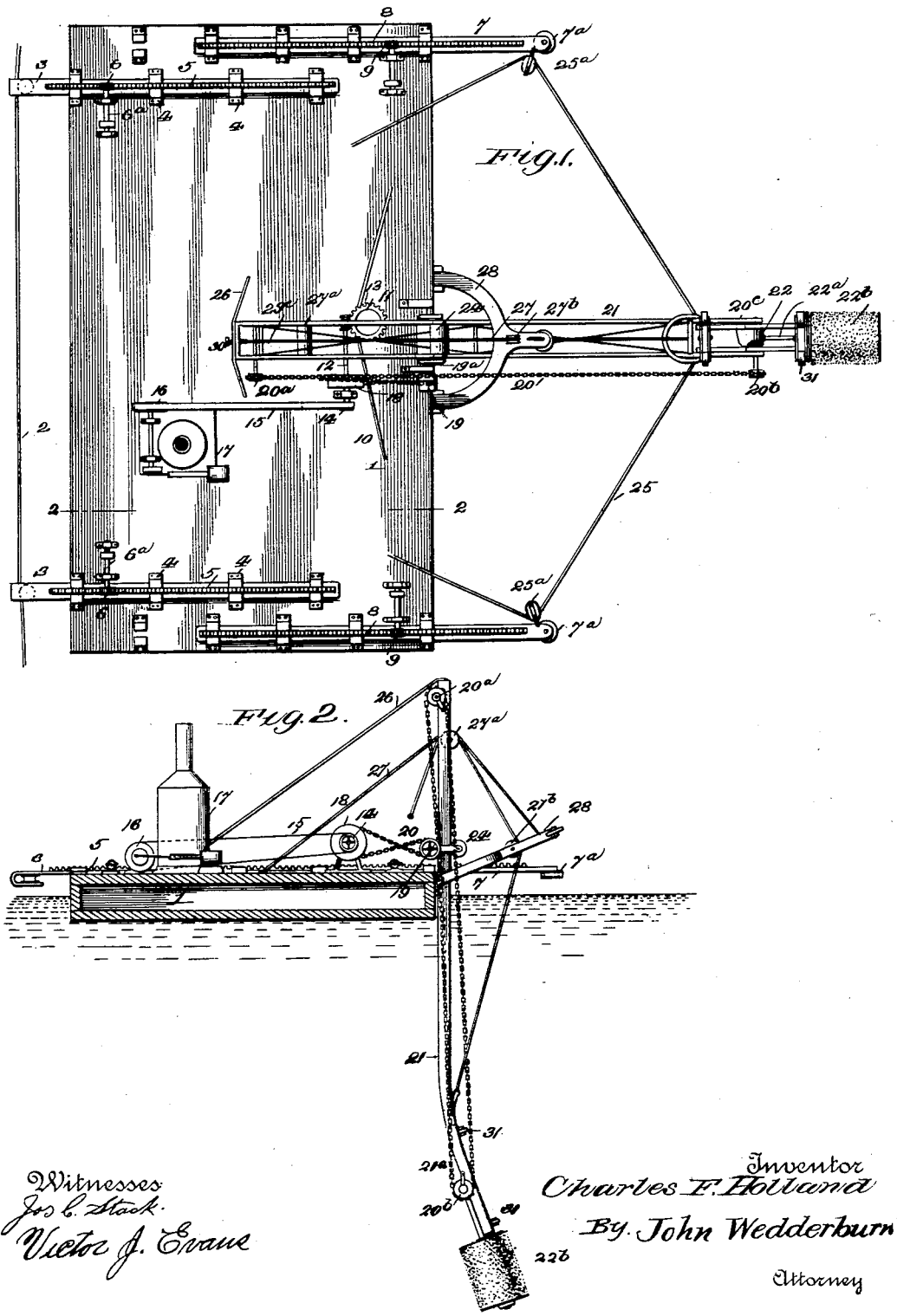

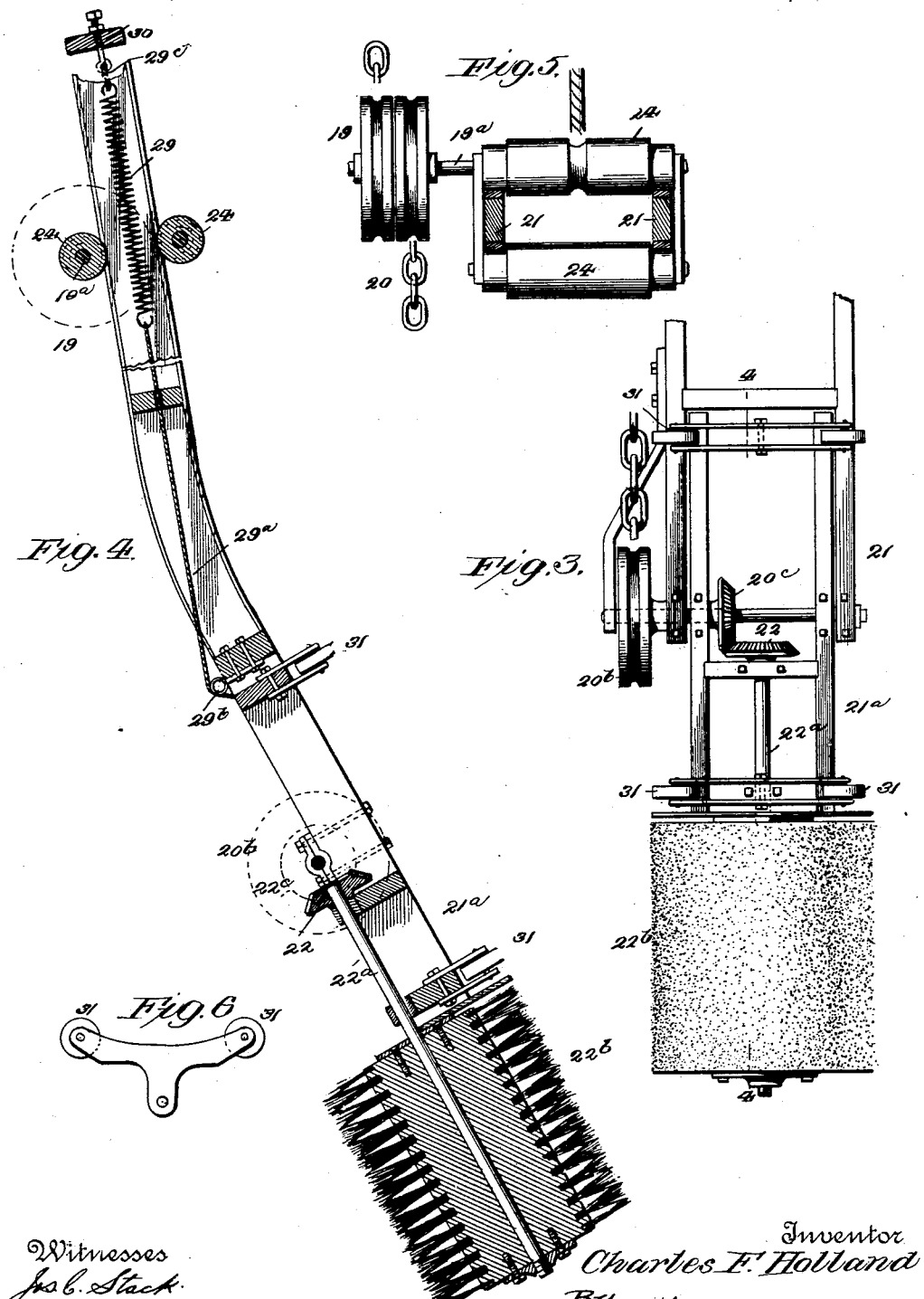

CHARLES F. HOLLAND, OF ELKO, NEVADA.

VESSEL-CLEANER.

SPECIFICATION forming part of Letters Patent No. 593,298, dated November 9, 1897.

Application filed April 10, 1897. Serial No. 631,544. (No model.)

*To all whom it may concern:*

Be it known that I, CHARLES F. HOLLAND, a citizen of the United States, residing at Elko, in the county of Elko and State of Nevada, have invented certain new and useful Improvements in Vessel-Cleaners; and I do hereby declare the following to be a full, clear, and exact description of the invention, such as will enable others skilled in the art to which it appertains to make and use the same.

This invention relates to a certain machine or apparatus for removing barnacles or other accumulations from the bottom of sea-going vessels, the object being to provide a machine or apparatus of this character which shall be capable of being carried on shipboard, so that the same may be put into use in so cleaning the bottom of the vessel at any time and place, thereby making faster time than with a foul bottom, reducing the time and expense involved to the minimum, and doing away with the necessity of dry-docking the vessel.

The invention comprises certain novel features of construction and arrangement of parts whereby the above and other important advantages are attained, as will be hereinafter fully described and specifically defined in the appended claims.

In the accompanying drawings, Figure 1 represents a plan view of the complete machine. Fig. 2 is a section thereof on the line 2 2 of Fig. 1. Fig. 3 is an enlarged plan view of the brush-carriage. Fig. 4 is a section of the same on the line 4 4 of Fig. 3. Fig. 5 is a detail view of the guide-rollers and chain-pulleys, and Fig. 6 is a view of the rollers used in connection with the brush-carriage.

Similar reference-numerals designate corresponding parts in all the figures of the drawings.

1 indicates a flat-decked scow upon which all the working parts of the whole apparatus are mounted, and this scow is designed to float by the side of the vessel to be cleaned, being held in proper position by means of a rope 2, both ends of which fasten to the vessel or to the dock. The said rope 2 passes over sheaves or pulleys rotatively held in the ends of arms 3, which are movably held on the deck of the scow by straps 4, and the arms are provided with racks 5, which engage with the teeth of pinions 6, located at the end of shafts $6^a$, mounted in suitable bearings located upon the deck of the scow. These arms serve to regulate the distance between the scow and the vessel, as it is evident that a movement in one direction or the other will serve to change the distance when desired. Similar arms 7 are located at the opposite side on the scow, the outer extremities of which are provided with rollers $7^a$, and each arm is moved in one direction or the other by means of the racks 8 and pinions 9, arranged similar to those described with relation to the arms 3.

A rope 10 is provided, the extremities of which are fastened to the ends of the vessel and the intermediate portions around the capstan 11, which latter is operated by a worm-gear on the end of the driving-shaft 12. This worm-gear intermeshes with the teeth of a worm-gear 13, secured to the capstan, and the outer end of the shaft 12 is provided with a pulley 14, around which the belt 15 passes, which latter receives its motion from a pulley 16, which is driven by an engine 17, located at any convenient part of the scow.

Pulleys 18 and 19 are located the former upon a driving-shaft 12 and the latter carried upon a shaft $19^a$, supported in suitable brackets arranged upon the deck of the scow, and over these pulleys 18 and 19 a chain 20 passes, the latter being crossed, as shown, whence it passes over pulleys or shafts $20^a$ and $20^b$, located at the upper and lower extremities of a ladder 21.

The shaft upon which the lower pulley $20^b$ is secured is provided with a bevel-gear $20^c$, which meshes with a similar gear 22, carried upon one end of the shaft $22^a$, the other end of which shaft carries the brush $22^b$, which may be made up of wire, steel, rubber scrapers, or in any manner as may be found most effective. The rotation, therefore, of the shaft or pulleys $20^a$ and $20^b$ will cause a rapid motion to be imparted to the brush, as will be readily understood.

The ladder 21 is located at the side of the scow and carries at its lower extremity a brush-carriage $21^a$, to which is rotatively secured the brush $22^b$. This ladder may be of any desired length and is adapted to work up and down and swing between guide-rollers 24, and to this ladder various ropes for handling it are attached, of which the ropes 25 are designed to steady the bottom end, first passing, however, over the pulleys or sheaves 25$^a$, located upon the outer end of the arms 7, and their terminals are secured to the deck. The ropes 26 are secured to the top of the ladder and to the deck, thus serving to steady the upper end of the ladder, while rope 27 passes over sheaves or pulleys 27$^a$ and 27$^b$, the former being rotatively secured to the ladder and the latter is secured to the intermediate portion of a swinging arm 28, pivotally secured to the side of the scow. One end of this rope 27 is connected with the ladder near its lower extremity, and the other end is secured to the deck in any desired or convenient manner.

The brush-carriage 21$^a$ has a tilting motion controlled by a spiral spring 29, the shaft upon which the pulley 20$^b$ is mounted serving as a fulcrum-point upon which the frame 21$^a$ will swing. One end of the spring 29 is secured to a short rope 29$^a$, which passes over the pulley 29$^b$, its end being secured to the upper end of the swinging frame 21$^a$, and the other end of the spring is attached to a rope 29$^c$, which passes up and connects with an adjusting-screw 30, located at the top of the ladder 21. The swinging frame 21$^a$ is also provided at its upper and lower extremities with longitudinally-arranged rollers 31, which are adapted to bear against the side of the vessel in the travel of the brush over the surface thereof, thus serving to lessen the possibility of friction. These rollers are arranged so that their peripheries lie in a direct line with the periphery of the revolving brush, so that the latter will not bear too heavily upon the surface of the vessel's bottom, and the supports for the rollers are pivotally connected, as shown, to the swinging frame 21$^a$ in such manner that they will adjust themselves to the varying unevenness of the vessel.

It will thus be seen that my invention provides in a simple and inexpensive manner a machine which can readily be operated to remove barnacles or other accumulations from a vessel's hull and which is so arranged that the ladder 21 may rock between the rollers 24 in such manner that the lower end thereof may be brought close up to the bottom of the vessel, so that the brush may be brought in contact therewith, as will be readily understood.

Modifications may be made without departing from the essential features of my invention, and I do not wish to be understood as limiting myself to the precise details of construction or arrangement of parts, reserving the right to make such changes and alterations therein as may be considered to fairly fall within its spirit and scope.

Having thus described my invention, what I claim, and desire to secure by Letters Patent, is as follows:

1. A machine or apparatus for cleaning or removing barnacles or other accumulations from the bottom of a vessel while afloat, comprising a scow or boat having adjustable attachments to limit the distance between the said scow or boat and the vessel to be cleaned, an adjustable ladder carried by said scow and capable of moving up and down, a rotating brush or scraper located at one end of the said ladder and capable of reaching all parts of the bottom of the vessel, and means to give rotation to the said brush or scraper, substantially as described.

2. A machine or apparatus for cleaning or removing barnacles or other accumulations from the bottom of a vessel, and comprising a scow or boat, an adjustable ladder having a brush located at one end thereof and carried by said scow or boat, sliding arms arranged at each side of the scow or boat, each being provided with a rack, pinions to engage with and move said racks back or forth to regulate the distance between the vessel and the scow, ropes engaging said arms and the end of the ladder to steady it, and means to rotate the said brush, substantially as described.

3. A machine or apparatus for cleaning or removing barnacles or other accumulations from the bottom of a vessel while afloat, comprising a boat or scow, a capstan located on said scow or boat, adapted to engage with a rope or cable connected to each end of the vessel to move the scow or boat along the side thereof, an adjustable ladder moving between guide-rollers located upon the scow, a revolving brush or scraper arranged upon a frame pivotally swung upon one end of the said ladder, bevel-gears carried by said frame and adapted to give rotation to the brush or scraper, and means to operate said gears and turn the capstan, substantially as described.

4. A machine or apparatus for removing barnacles or other accumulations from the bottom of a vessel, comprising a scow or boat having sliding arms arranged thereon, each of which is provided with racks, pinions to engage said racks and give movement to the arms, rollers located upon the end of the arms arranged at one side of the scow or boat and adapted to bear upon the side of the vessel, sheaves or pulleys pivotally arranged upon said arms, a rope engaging the said pulleys of the arms at one side of the scow or boat, the ends of which are connected to the ends of the vessel or to the dock, an adjustable ladder carried by said scow or boat having a swinging frame arranged upon one end thereof, bevel-gears carried between said swinging frame and adapted to give rotation to the brush or scraper supported by said swinging frame, and rollers located upon said swinging frame, and adapted to bear upon the side of the vessel while being scraped or cleaned, and means to rotate the brush, substantially as described.

5. A machine or apparatus for the purposes described, comprising a scow or boat having a capstan thereon, a worm-gear secured to said capstan and meshing with a worm located upon the shaft arranged upon the deck, pulleys arranged upon said shaft, a belt engaging one of said pulleys and the pulley of an engine, a sliding ladder having an adjustable rotatively-arranged brush or scraper at one end thereof, bevel-gears adapted to give rotation to the said brush or scraper, pulleys arranged upon the ends of the ladder, one of which is secured to the shaft carrying one of the bevel-gears, and a chain adapted to pass over said pulleys, idler-pulleys arranged upon the deck, and the pulley secured to the worm-shaft, substantially as described.

In testimony whereof I have signed this specification in the presence of two subscribing witnesses.

CHARLES F. HOLLAND.

Witnesses:
  J. A. McBride,
  A. J. Pullman.